Figure 11:
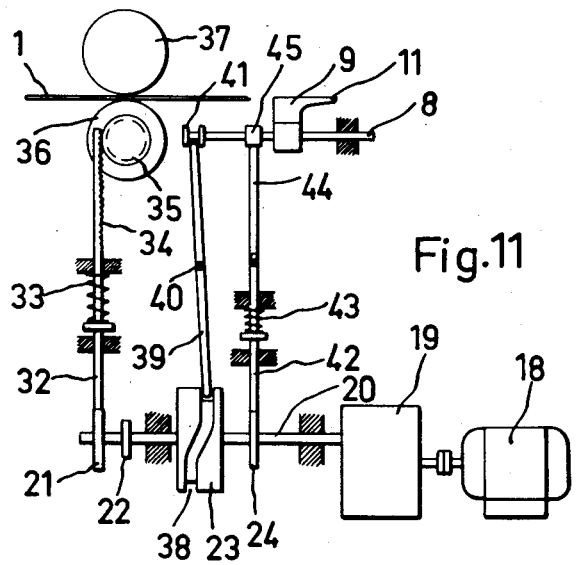

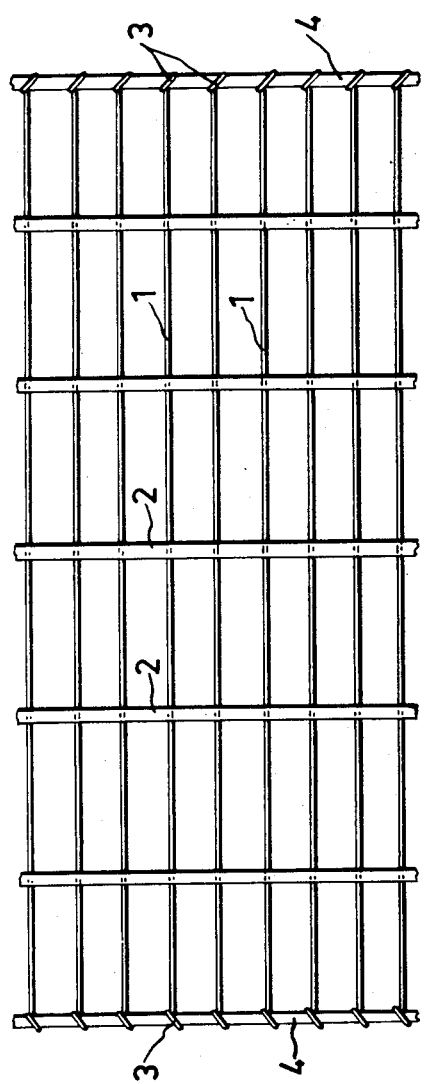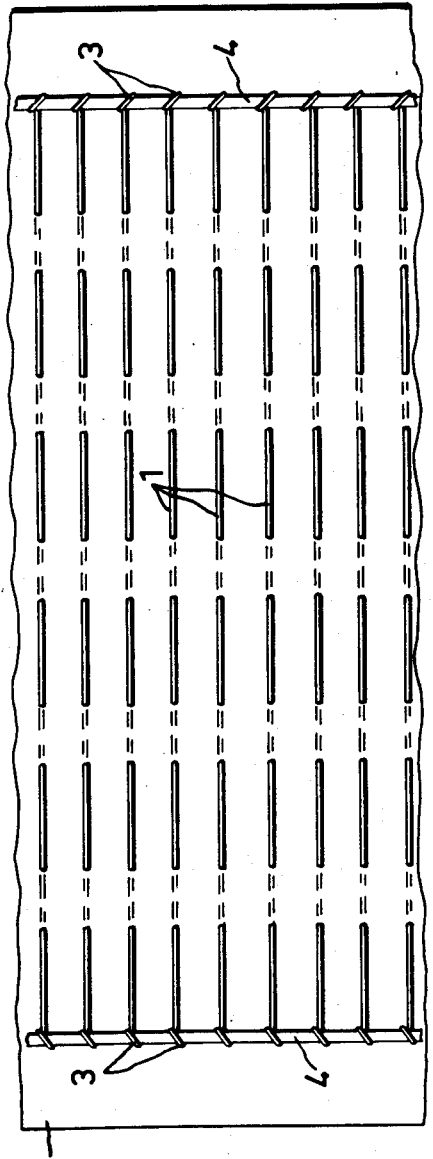

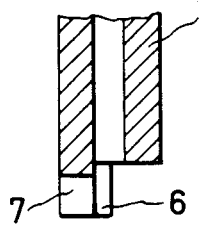
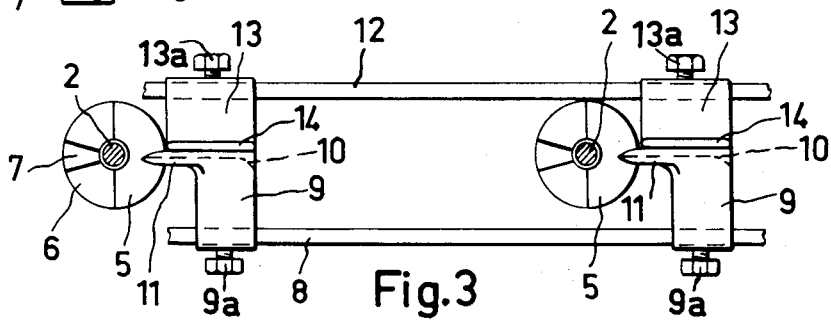
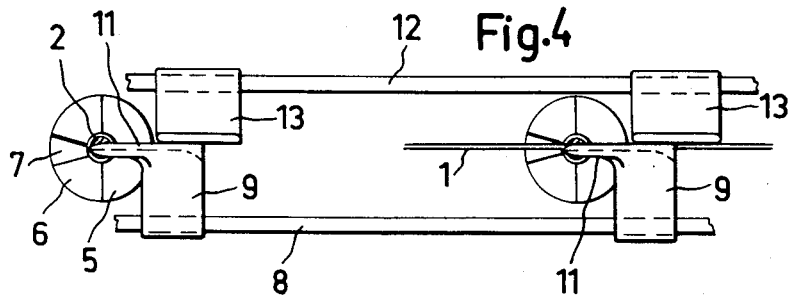
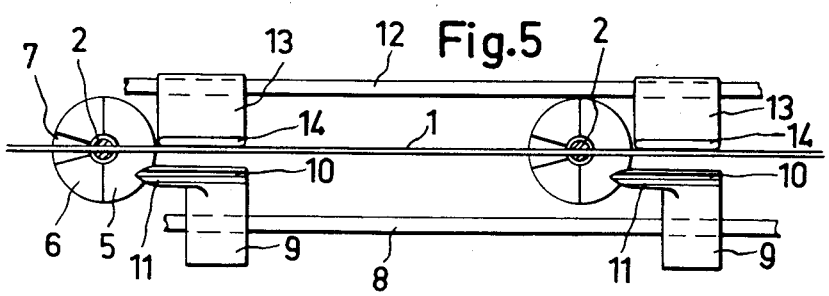

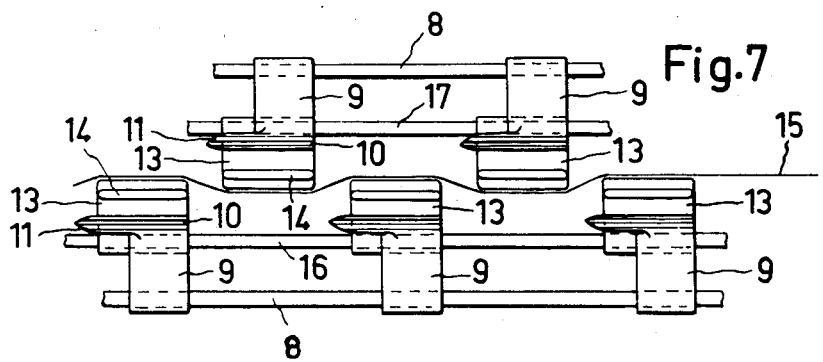
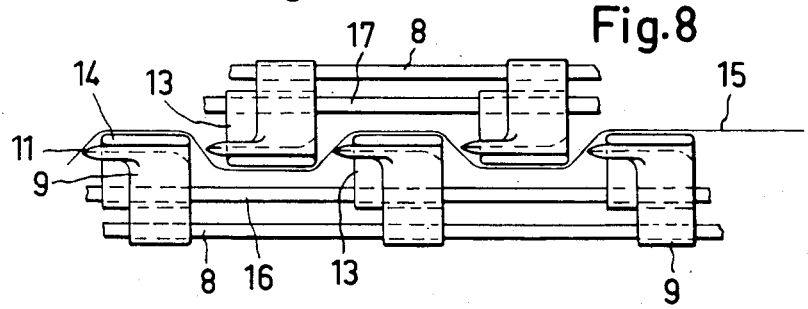
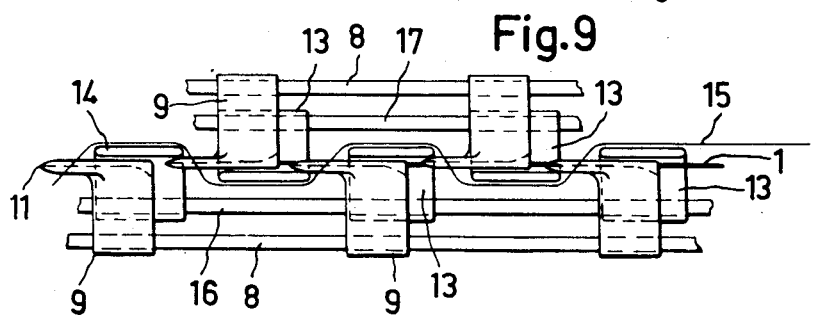
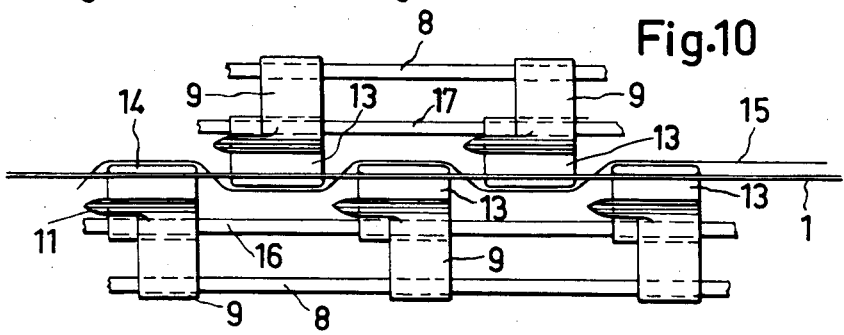

June 16, 1964  S. LÖFGREN  3,137,324
METHOD OF MANUFACTURING UPHOLSTERY
INLAYS AND A MACHINE THEREFOR
Filed Nov. 17, 1958  4 Sheets-Sheet 4

SIGFRID LÖFGREN
INVENTOR
BY Wendenoth, Lind + Ponack
ATTORNEYS

United States Patent Office 3,137,324
Patented June 16, 1964

3,137,324
METHOD OF MANUFACTURING UPHOLSTERY
INLAYS AND A MACHINE THEREFOR
Sigfrid Löfgren, Malmo, Sweden, assignor to Madrass-
Fabriken Dux Aktiebolag, Malmo, Sweden, a corporation of Sweden
Filed Nov. 17, 1958, Ser. No. 774,400
Claims priority, application Sweden Nov. 20, 1957
12 Claims. (Cl. 140—3)

There are previously known upholstery inlays consisting of a plurality of parallel straight spring wires which are passed at intervals through a holder web fixing the wires in correct relative positions, said holder web consisting of a textile web or a series of parallel strings at right angles to the spring wires. In the manufacture of such upholstery inlays, the holder web is fed stepwise in one direction along guide means, and between the feed steps a piece of spring wire is passed at intervals through the holder web at right angles to the feed direction, said piece of spring wire being guided in channels in said guide means.

The present invention relates to a method of manufacturing such upholstery inlays in a quicker and safer manner, and the invention also provides for an inexpensive adjustment of the machine for manufacturing upholstery inlays of different widths and with different distances between the points where the spring wires pass through the holder web. The method according to the invention is characterized in that the channelled guide means, of which there is one at each point where the spring wire is to penetrate the holder web, are caused to penetrate with a channelled spike the arrested holder web in the direction of insertion of the spring wire before the latter is passed through the channels of the guide means, said guide means being moved out of engagement with the holder web and the spring wire before the holder web is advanced in the next step.

The invention also relates to a machine for carrying out the above method, comprising a mechanism for stepwise feeding a holder web along channelled guide means, and a mechanism adapted, between the feed steps of the holder web, to pass a piece of spring wire through the channels of the guide means and at intervals through the holder web. This machine is characterized in that the guide means are attached to one or more support bars extending in the direction of insertion of said piece of spring wire and displaceable in said direction, the channel of each guide means extending across a surface of said guide means from one edge of said surface and along a pointed spike projecting from that side of the guide means which faces away from said surface edge.

Figure 12:
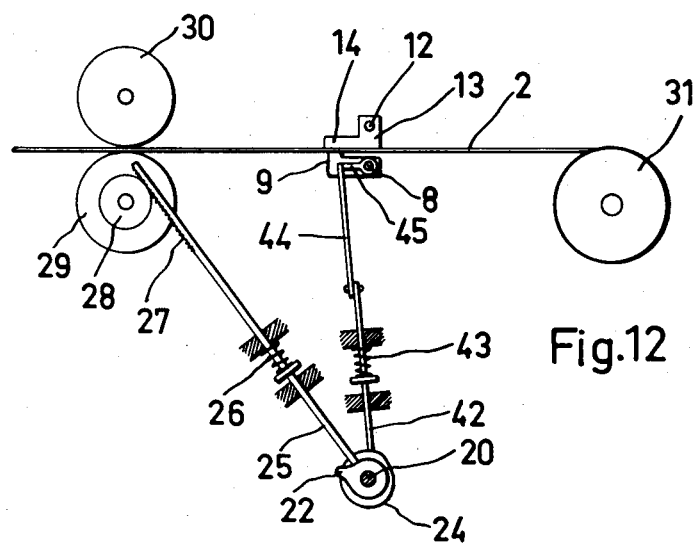

The invention will be described more in detail in the following, reference being had to the accompanying drawings which schematically illustrate two embodiments thereof. In the drawings:

FIGS. 1 and 2 illustrate two different types of upholstery inlays that can be manufactured in accordance with the present invention, FIGS. 3, 4 and 5 illustrate a machine for manufacturing the upholstery inlay according to FIG. 1, in three different working positions, FIG. 6 is a horizontal section of a detail of the machine according to FIGS. 3 to 5, FIGS. 7 to 10 illustrate a machine for the manufacture of the upholstery inlay according to FIG. 2, in four different working positions, and FIGS. 11 and 12 are schematic views of certain drive mechanisms for the machine according to FIGS. 3 to 5.

The upholstery inlay illustrated in FIG. 1 consists of a plurality of parallel, substantially straight spring wires 1 which are passed at intervals through a holder web fixing the wires in correct relative positions, said holder web consisting of a series of parallel strings 2 running at right angles to the spring wires 1. The end 3 of the spring wires 1 are bent around edge strings 4 forming the marginal edges of the inlay.

An upholstery inlay of this design is previously known as is a machine for the manufacture of this inlay, for which reason merely the novel features of the machine according to the invention are schematically shown in FIGS. 3 to 6. In this machine, the strings 2 are fed stepwise each through a tube 5. These tubes are secured to the machine frame (not shown) in parallel positions. For easy adjustment of the relative distances of the strings 2, the tubes 5 can be adjustably mounted on the machine. The axes of the tubes 5 lie in a common horizontal plane, and their ends, which in FIGS. 3 to 5 are turned forwards, lie in a common vertical plane. These tube ends have a recess which has been formed by cutting away the right-hand half of the tube wall (as seen in FIGS. 3 to 6) so that the tube ends obtain a forwardly directed projection 6 extending along half of the periphery of the tube. This projection has a radial slot 7 which widens from the central passage of the tube in a direction towards the periphery of the tube.

A support bar 8 extends underneath all of the tubes 5 at right angles to their longitudinal direction and is longitudinally reciprocable. Secured to the support bar 8 adjacent each tube 5 is a guide means 9 which has a channel 10 in its upper side. Said channel extends across the upper side of the guide means from the edge thereof which faces away from the adjacent tube 5 and along a pointed spike 11 projecting from the side of the guide means facing the tube 5.

The machine frame (not shown) carries a support bar 12 which is parallel to the support bar 8 and carries abutments 13. These abutments 13 are provided with a lower abutment plate 14 having its underside coplanar with the lower edge of the upper boundary wall of the tube slots 7.

The guide means 9 and the abutments 13 are adjustably mounted on their support bars 8, 12 by means of set screws 9a and 13a (shown only in FIG. 3) so that each of them can be disposed in a suitable position adjacent a tube 5, after the tubes have been adjusted into the desired positions. By turning the support bar 8, the guide means 9 can be swung between the position illustrated in FIG. 5, in which the channelled upper side of the guide means is spaced from the underside of the plate 14 of the abutments 13, and the position illustrated in FIGS. 3 and 4, in which the upper side of the guide means abuts the underside of the plate 14 of the abutments 13 so that the plate 14 laterally covers at least that end portion of the channel 10 of the pertaining guide means which is farthest away from the spike 11 and the pertaining tube 5 in order to form together with the guide means a tubular passage which is open at its ends and whose axis intersects those of the tubes 5.

The machine described in connection with FIGS. 3 to 6 operates as follows. The strings 2 in the tubes 5 are fed one step, the size of which corresponds to the distance between two successive pieces of spring wire 1 in FIG. 1. After such a feed step the parts of the machine take up the position illustrated in FIG. 3, in which the guide means 9 abut the plates 14 of the abutments 13. As soon as the feed step of the strings 2 has terminated, the bar 8 is displaced to the left with respect to FIG. 3 into the position illustrated in FIG. 4 so that the spikes 11 of the guide means 9 are passed through the strings 2 which during this operation are supported by the projections 6 of the tubes 5. During this displacement, the points of the spikes 11 will engage the slots 7 of the tubes. After this, a straight spring wire 1 is inserted in a manner previously known through the aligned channels 10 of the guide means 9, the spring wire being guided by the plates 14 and the channels 10 of the guide means 9. As the spikes 11 have already penetrated the strings 2, the spring wire 1 is free to pass through the strings 2 within the channel 10 of the spikes 11, without it being necessary that they first push aside string material. After the spring wire 15 has been inserted through all of the strings 2, its ends 3 are bent, in a manner previously known, around the marginal strings 4 (not shown in FIGS. 3 to 6). The bar 8 is then moved back to the right so that the spikes 11 leave the strings 2, the bar being turned somewhat to withdraw the guide means 9 from the mounted wire 1. This position of the parts is illustrated in FIG. 5. The strings 2 can now be fed a further step, whereupon the described operation is repeated for mounting a new piece of spring wire.

Some of the mechanisms for operating the machine according to FIGS. 3 to 5 in the manner described are illustrated schematically in FIGS. 11 and 12. A cam shaft 20 mounted in the machine frame and carrying four cams 21, 22, 23 and 24 is driven by a drive motor 18 over a reduction gear 19. Against the cam 22 abuts the lower end of a bar 25 displaceably mounted in the machine frame and held against the cam by a spring 26. The upper end of the bar is provided with teeth 27 meshing with teeth on one half of a one-way clutch 28, the other half of which is connected with a feed roll 29 cooperating with a pressure roll 30 for frictional engagement with the finished upholstery inlay web coming from the operating means 9, 13, the strings 2 of the inlay web being fed to the operating means 9, 13 from a warp beam 31. During each rotation of the cam shaft 20, the bar 25 is pushed upwards by the cam 22, and during this movement the teeth 27 turn the clutch 28 in the direction of engagement so that the rolls 29, 30 advance the inlay web a distance corresponding to the distance between two successive spring wires 1 in the inlay illustrated in FIG. 1. The spring 26 then returns the bar 25 to the position shown in FIG. 12, during which return movement the one-way clutch 28 is disengaged so that the feed rolls 29, 30 are not turned back after the feed step.

The cam 21 cooperates with a corresponding feed device consisting of a displaceable bar 32 having a pressure spring 33 and teeth 34 for engagement with a one-way clutch 35 which is connected with a feed roll 36 cooperating with a counterpressure roll 37 for the advance of the spring wire 1. During each rotation of the cam shaft 20, a piece of spring wire 1 is thus pushed through the strings 2 while being guided by the guide means in the manner described, and during the return of the bar 32 by means of the spring 33, the clutch 35 is disengaged so that the rolls 36, 37 are not turned back after the feed step. The spring wire 1 must of course be guided in a channel or passage (not shown) between the feed rolls 36, 37 and the first guide means 9. The pieces of spring wire 1 may either be advanced one by one in suitable lengths for mounting in the manner described or a continuous spring wire can be advanced which is cut into adequate pieces after each feed step of the rolls 36, 37 by cutting means (not shown) operated by a cam (not shown) which is mounted on the cam shaft 20.

As already mentioned, the bar 8 is displaceably and rotatably mounted in the machine frame. The bar 8 is displaced by the cam disk 23 which has a peripheral groove 38 of suitable form, in which engages the lower end of a two-armed lever 39 mounted in the machine frame at 40 and having its upper end engaging in a peripheral groove in a bushing 41 mounted on one end of the bar 8. The engagement of the lever 39 with the bushing 41 is such that the bar 8 can be freely rotated without being disturbed by this engagement. During each rotation of the cam shaft 20, the cam groove 38 causes the lever 39 to be reciprocated once, the bar 8 being reciprocated in its bearings in the manner previously described.

The cam disk 24, finally, serves to rotate the bar 8 in the manner already described. To this end, there abuts against the cam disk 24 the lower end of a bar 42 displaceably mounted in the machine frame and held in abutment against the cam disk by a spring 43. The upper end of the bar 42 is hingedly connected with the lower end of a link 44 having its upper end hingedly connected with an arm 45 fixed to the bar 8. During each rotation of the cam shaft 20, the bar 42 is pushed downwards by the spring 43 and returned into raised position by the cam disk 24 against which the bar abuts all the time under the action of the spring 43. During the said movement of the bar 42, the arm 45 is first pulled downwards and then pushed upwards by the link 44, whereby the bar 8 is rotated in the manner described. The link 44 is so arranged that the bar 8 can be displaced longitudinally without interference from the mechanism for rotating the bar.

Like the upholstery inlay according to FIG. 1, the inlay shown in FIG. 2 has substantially straight spring wires 1 having their ends 3 bent around marginal strings 4. In FIG. 2, however, the spring wires 1 are retained at correct relative distances in that they are passed alternately from above down through and from below up through a textile holder web 15 at longitudinally spaced apart points.

The machine which is used for the manufacture of the upholstery inlay according to FIG. 2 and which is illustrated in FIGS. 7 to 10 also is in substantial agreement with the machine according to FIGS. 3 to 6. Thus it comprises two sets of guide means 9 of the type earlier described having pointed spikes 11 and guide channels 10. One set of guide means 9 is disposed beneath the textile web 15 and adjustably mounted on a support bar 8 rotatable and displaceable in the manner previously described. The other set of guide means is adjustably mounted on an identical support bar 8 above the textile web 15 in such a position that the guide means 9 disposed above the textile web 15 are located directly above the gaps between the guide means 9 disposed beneath the textile web. In addition, there are two sets of abutments 13 having plates 14 of the type previously described. One set of abutments 13 is located beneath the textile web 15 and adjustably mounted on a bar 16 rotatably but non-displaceably mounted in the machine frame, while the other set of abutments is disposed correspondingly above the textile web 15 on a rotatable but non-displaceable bar 17. The mechanisms for operating the bars 8, 16 and 17 essentially correspond to these described in connection with FIGS. 11 and 12 for the bar 8.

The machine illustrated in FIGS. 7 to 10 operates as follows. In the position shown in FIG. 7, the textile web 15 passing alternately over and beneath the plates 14 of the abutments 13 can be fed a step corresponding to the distance between two successive spring wires 1 in FIG. 2. After such a feed step, the bars 8, 16 and 17 are turned in such a way that the associated guide means 9 and abutment plates 14 are pressed against each other and the guide passages defined by them will be aligned. The textile web 15 is thus caused to form deeper waves between the abutment plates 14 than is shown in FIG. 7. This position of the parts is shown in FIG. 8. The bars 8 are then moved to the left in respect to FIG. 8 to the position shown in FIG. 9, so that the spikes 11 of the guide means 9 penetrate the textile web 15. The spring wire 1 is now inserted through the aligned channels 10 of the guide means 9, which are partly closed laterally by the abutment plates 14. As the spikes 11 have penetrated the textile web 15, the spring wire 1 need not push aside textile material during its penetrating movement. After the ends 3 of the inserted piece of spring wire have been bent around the marginal strings 4 (FIG. 2) in a manner previously known and therefore not illustrated, the bars 8 are moved back to the right so that the spikes 11 are moved out of engagement with the textile web 15, whereupon the bars 8, 16 and 17 are turned in order to move the guide means 9 out of engagement with the spring wire 1 and return the parts to the position shown in FIG. 7. The textile web 15 can now be fed a further step to permit mounting of a new spring wire in the manner heretobefore described.

What I claim and desire to secure by Letters Patent is:

1. A method of manufacturing an upholstery inlay consisting of a plurality of parallel substantially straight spring wires which are passed at intervals through a holder web fixing the wires in correct relative position, said method comprising feeding the holder web stepwise in one direction along guide means arranged in a row extending crosswise of said one direction and having channelled spikes thereon projecting in alignment from one side of said guide means in the direction of said row, moving said guide means in the direction of the length of said row to cause the channelled spikes to penetrate the holder web between the feed steps at spaced points along said row of guide means, passing a length of spring wire through the aligned channels of said spikes while the holder web is penetrated by said spikes, and moving said guide means and the spikes thereon out of engagement with the holder web and said length of spring wire before the holder web is advanced in the next feed step.

2. A method of manufacturing an upholstery inlay consisting of a plurality of parallel substantially straight spring wires which are passed at intervals through a holder web fixing the wires in correct relative positions, said method comprising feeding the holder web stepwise in one direction along pairs of channelled guide means and abutment means arranged in a row extending crosswise of said one direction, said guide means having channelled spikes thereon projecting in alignment from one side of said guide means in the direction of said row, moving said guide means and abutment means into contact with each other between the feed steps so that each abutment means laterally covers at least a portion of the channel of the guide means associated therewith so as to form together with said guide means a tubular channel which is open at its ends, said tubular channels of the pairs of guide means and abutment means being aligned, moving said guide means in the direction of said row to cause the channelled spikes to penetrate the holder web at spaced points along said row of guide means and abutment means while said guide means and abutment means are in contact with each other, passing a length of spring wire through said channels while the holder web is penetrated by said spikes, and moving said guide means and the spikes thereon out of engagement with the holder web and said length of spring wire and separating said guide means and abutment means before the holder web is advanced in the next feed step.

3. A machine for manufacturing an upholstery inlay consisting of a plurality of parallel substantially straight spring wires which are passed at intervals through a holder web fixing the wires in correct relative positions, said machine comprising a mechanism for feeding the holder web stepwise along a feed path, supporting means adjacent said path, a plurality of guide means supported by said supporting means in a row extending across the feed path of the holder web, means operable in timed relationship with said feeding mechanism for reciprocating said supporting means toward said feed path and then in the direction of the row, and then in the reverse direction, said means operable between feed steps of said feeding mechanism, a pointed spike projecting from one side of each guide means in the direction of the row of guide means, each guide means having a channel extending along said spike and across one surface of each guide means, the channels of all guide means being aligned and parallel with said row of said guide means, and a device operable in time relationship with said reciprocating means for passing a length of spring wire through the channels of said guide means after said supporting means has been moved in the direction of said row.

4. A machine according to claim 3 in which said guide means are adjustably mounted on said supporting means.

5. A machine according to claim 3 in which alternate guide means on said supporting means are positioned on opposite sides of the feed path of the holder web.

6. A machine for manufacturing an upholstery inlay consisting of a plurality of parallel substantially straight spring wires which are passed at intervals through a holder web fixing the wires in correct relative positions, said machine comprising a mechanism for feeding the holder web stepwise along a feed path, first supporting bar means, a plurality of guide means supported by said first supporting bar means in a row extending across the feed path of the holder web, means for reciprocating said first supporting bar means between the feed steps of said mechanism so that said guide means are reciprocated in the direction of their row, a pointed spike projecting from one side of each guide means in the direction of the row of guide means, each guide means having a channel extending along said spike and across one surface of each guide means, the channels of all guide means being aligned and parallel with said row of said guide means, second supporting bar means, a plurality of abutment means one supported by said second supporting means adjacent each of said guide means, means for turning said first and second supporting bar means for moving said guide means and said abutment means against each other between the feed steps of said mechanism so that each abutment means covers at least that portion of the channel of the guide means against which it is moved which is farthest away from said spike on the guide means, and a device for passing a length of spring wire through the channels of said guide means between the feed steps of said mechanism, said feeding mechanism, said reciprocating means, said turning means and said wire passing device being interconnected for operating said reciprocating and turning means between the feed steps, and operating said wire passing device when only half the movement of said reciprocating and turning means is complete.

7. A machine for manufacturing an upholstery inlay consising of a plurality of parallel substantially straight spring wires which are passed at intervals through a holder web fixing the wires in correct relative positions, said machine comprising a mechanism for feeding the holder web stepwise along a feed path, supporting means adjacent said path, a plurality of guide means supported by said supporting means in a row extending across the feed path of the holder web, means for reciprocating said supporting means between the feed steps of said mechanism from a first position in one sense to a second position and from said second position in another sense to a third position and then back again through said second position to said first position so that said guide means are reciprocated at an angle to their row while said supporting means move between said first and second positions, and in the direction of the row while said supporting means move between said second and third positions, a pointed spike projecting from one side of each guide means in the direction of the row of guide means so as to be leading when said supporting means move from said second position to said third position in order to penetrate the holder web, each guide means having a channel extending along said spike and across one surface of each guide means, the channels of all guide means being aligned and parallel with said row of said guide means, a device for passing a length of spring wire through the channels of said guide means when operated, and means for operating said device while said supporting means are located in said third position, the movement of said guide means from said third position to said second position serving to retract said spikes from their penetration engagement with the holder web and the movement of said guide means from said second position to said first position serving to disengage said guide means and said spikes from the length of spring wire inserted in the channels of said guide means and said spikes while said guide means occupied said third position.

8. A machine for manufacturing an upholstery inlay consisting of a plurality of parallel substantially straight spring wires which are passed at intervals through a holder web fixing the wires in correct relative position, said machine comprising a mechanism for feeding the holder web stepwise along a feed path, supporting means adjacent said path, a plurality of guide means supported by said supporting means in a row extending across the feed path of the holder web, means for reciprocating said supporting means between the feed steps of said mechanism from a first position in one sense to a second position and from said second position in another sense to a third position and then back again through said second position to said first position so that said guide means are reciprocated at an angle to the row while said supporting means move between said first and second positions, and in the direction of the row while said supporting means move between said second and third positions, a pointed spike projecting from one side of each guide means in the direction of the row of guide means so as to be leading when said supporting means move from said second position to said third position in order to penetrate the holder web, each guide means having a channel extending along said spike and across one surface of each guide means, the channels of all guide means being aligned and parallel with said row of said guide means, a plurality of abutment means, holding means mounting said abutment means in positions where each abutment means will be contacted by one of said guide means when said supporting means occupy said second and third positions, said abutment means being contacted by said guide means so that each abutment means covers at least that portion of the channel of the guide means against which it is moved which is farthest away from said spike on the guide means, a device for passing a length of spring wire through the channels of said guide means when operated, and means for operating said device while said supporting means are located in said third position, the movement of said guide means from said third position to said second poistion serving to retract said spikes from their penetration engagement with the holder web and the movement of said guide means from said second position to said first position serving to disengage said guide means and said spikes from the length of spring wire inserted in the channels of said guide means and said spikes while said guide means occupied said third position.

9. A machine according to claim 8, further comprising means for adjustably mounting said guide means and said abutment means on said supporting means and said holding means, respectively.

10. A machine according to claim 8 in which alternate pairs of said guide means and said abutment means are positioned on opposite sides of the feed path of the holder web.

11. A machine for manufacturing an upholstery inlay consisting of a plurality of parallel substantially straight spring wires which are passed at intervals through a holder web fixing the wires in correct relative positions, said machine comprising a mechanism for feeding the holder web stepwise along a feed path, first supporting bar means, a plurality of guide means supported by said first supporting bar means in a row extending across the feed path of the holder web, a pointed spike projecting from one side of each guide means in the direction of the row of guide means, each guide means having a channel extending along said spike and across one surface of each guide means, the channels of all guide means being aligned and parallel with said row of said guide means, second supporting bar means, a plurality of abutment means one supported by said second supporting bar means adjacent each of said guide means, means for turning said first and second supporting bar means between the feed steps of said mechanism for first moving said guide means and said abutment means against each other so that each abutment means covers at least that portion of the channel of the guide means against which it is moved which is farthest away from said spike on the guide means, and then moving said guide means and said abutment means away from each other, means for reciprocating said first supporting bar means when said guide means and said abutment means have been moved against each other but before they are moved away from each other again, so that said guide means are reciprocated in the direction of their row from a first position to a second position and back to said first position, said spikes leading during the movement of said guide means from said first position to said second position in order to penetrate the holder web, a device for passing a length of spring wire through the channels of said guide means, when operated, and means for operating said device while said guide means are located in said second position, the movement of said guide means from said second position to said first position serving to retract said spikes from their penetrating engagement with the holder web and the movement of said guide means and said abutment means away from each other serving to disengage said guide means and said spikes from the length of the spring wire inserted in the channels of said guide means and said spikes while said guide means occupied said second position.

12. A machine for manufacturing an upholstery inlay consisting of a plurality of parallel substantially straight spring wires which are passed at intervals through a holder web fixing the wires in correct relative positions, the holder web consisting of a series of parallel strings at substantially right angles to the spring wires, said machine comprising tube means arranged in a row with their axes at right angles to the row and through which the strings of the holder web are guided, a mechanism for feeding the strings stepwise through said tube means, supporting means adjacent said tube means, a plurality of guide means supported by said supporting means in a row along the row of said tube means with one located adjacent each of said tube means, a pointed spike projecting from one side of each guide means in the direction of the row of guide means, each guide means having a channel extending along said spike and across one surface of each guide means, the channels of all guide means being aligned and parallel with said row of said guide means, each of said tube means having a recess in a wall portion of said tube means facing said spikes on said guide means, said tube means further having a slot in a wall portion of said tube means facing away from said spikes of said guide means, means for reciprocating said supporting means between the feed steps of said mechanism from a first position in one sense to a second position and from said second position in another sense to a third position and then back again through said second position to said first position so that said guide means are reciprocated at an angle to their row while said supporting means move between said first and second positions, and in the direction of their row while said supporting means move between said second and third positions, said spikes periodically penetrating through the strings guided by said tube means and extending into the slots of said tube means when said guide means move from said second position to said third position, a device for passing a length of spring wire through the channels of said guide means while said spikes extend into the slots of said tube means, the movement of said guide means from said third position to said second position serving to disengage said spikes from the strings and said tube means and the movement of said guide means from said second position to said first position serving to disengage said guide means and said spikes from the length of spring wire inserted in the channels of said guide means and said spikes while said guide means occupied said third position.

References Cited in the file of this patent

UNITED STATES PATENTS

| | | |
|---|---|---|
| 1,690,100 | Bull | Nov. 6, 1928 |
| 1,830,463 | Foster et al. | Nov. 30, 1931 |
| 2,218,749 | Heilman | Oct. 22, 1940 |
| 2,218,758 | Leal | Oct. 22, 1940 |
| 2,599,226 | Briem | June 3, 1952 |
| 2,648,842 | Shockey | Aug. 18, 1953 |
| 2,781,532 | Hoffman | Feb. 19, 1957 |
| 2,800,151 | Shockey | July 23, 1957 |
| 2,862,466 | Bryant et al. | Dec. 2, 1958 |
| 2,911,014 | Van Nest | Nov. 3, 1959 |